Nov. 22, 1949 — G. PISTEY — 2,489,194
HANDLE EQUIPPED FRYING PAN WITH
HOLDER FOR PANCAKE TURNERS
Filed May 11, 1945
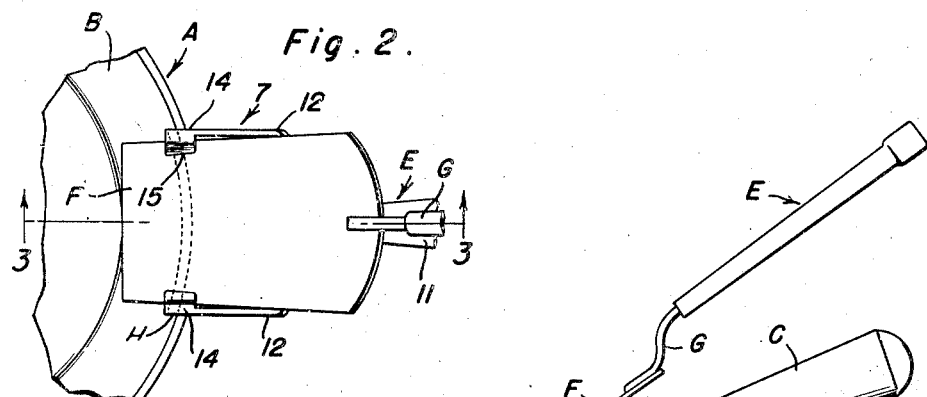
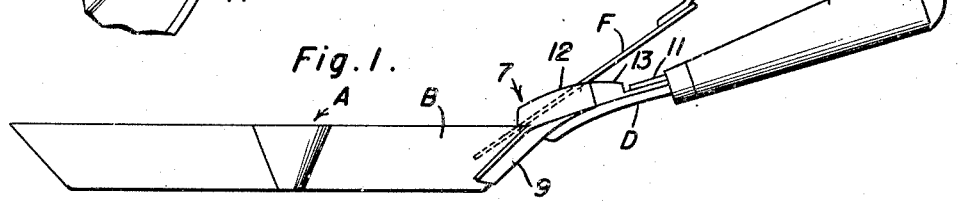
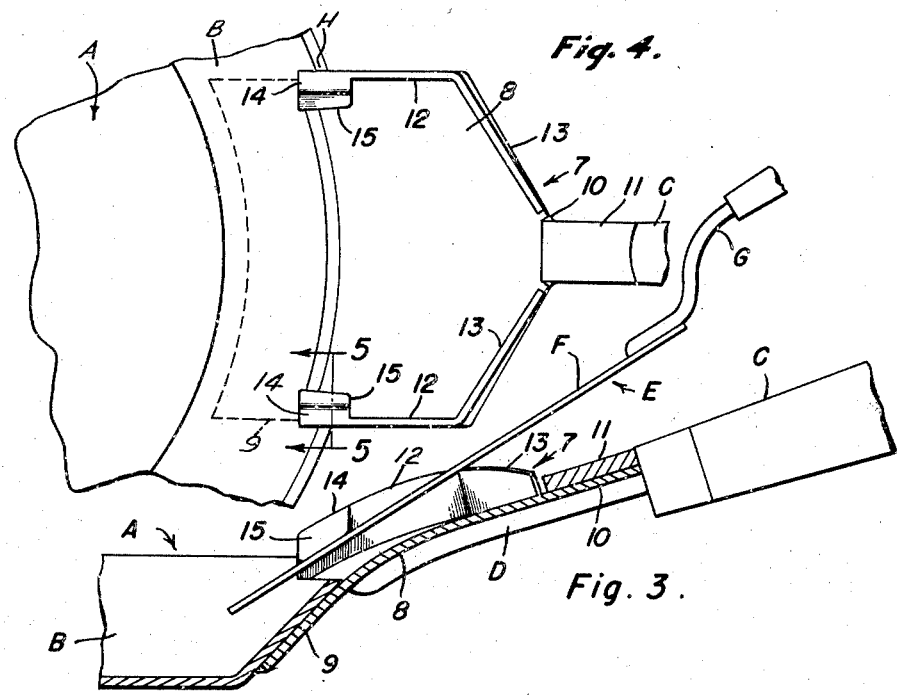
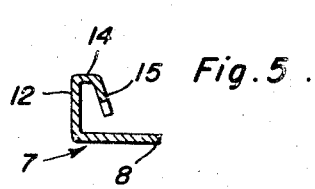
Inventor
George Pistey Patented Nov. 22, 1949

2,489,194

UNITED STATES PATENT OFFICE 2,489,194

HANDLE EQUIPPED FRYING PAN WITH HOLDER FOR PANCAKE TURNERS

George Pistey, Vallejo, Calif.

Application May 11, 1945, Serial No. 593,201

4 Claims. (Cl. 220—94)

The present invention relates, generally speaking, to cooking utensils and has more particular reference to a frying pan with a rim attached handle, the handle having incorporated therein an especially constructed device which constitutes a novel and satisfactory holder for the blade of a conventional-type pancake turner.

It is an object of the invention to provide a simple, efficient and highly practical pancake turner holder which is conveniently situated between the aforesaid handle and the rim of the pan, said holder providing not only facilities for conveniently elevating and suspending a pancake turner blade in readily applicable and removable position, but, in addition, providing an excess grease trapping, retrieving and returning receptacle.

More specifically, the holder is primarily a plate provided with marginal flanges to support the blade of the pancake turner in elevated and inclined position, there being suitably positioned and shaped detents or lugs to firmly clamp the blade in such a manner and position as to permit surplus grease to be collected and to gravitate back into the pan.

Other features and advantages will become more readily apparent from the following description and the accompanying illustrative drawings.

In the drawings, wherein like numerals are employed to designate like parts throughout the views:

Figure 1 is a side elevational view of a frying pan, a conventional pancake turner, and the improved attachment on the pan, with the pancake turner mounted therein.

Figure 2 is a fragmentary top plan view showing the arrangement and construction of parts more explicitly.

Figure 3 is an enlarged sectional view taken approximately on the plane of the line 3—3 of Figure 2, the pancake turner appearing in elevation.

Figure 4 is a top plan view, slightly enlarged, with the pancake turner removed, to disclose the parts that would otherwise be covered thereby.

Figure 5 is an enlarged detail section taken approximately on the plane of the line 5—5 of Figure 4.

Referring now to the drawings by distinguishing reference numerals, it will be seen that the frying pan, which is essentially of ordinary shape, is denoted by the reference character A, the rim of said pan being denoted at B, the handle at C and the handle attaching tang at D. The pancake turner E, which is conventional, comprises the usual blade F and offset handle G.

In order to accommodate my novel grease trapping, retrieving and returning device or holder the upper edge of the rim of the pan is provided with a notch H. The handle means C, instead of being directly connected with the rim of the pan, as is customary, is connected with the holder and the holder, in turn, is connected with the notched portion of the rim of the pan so that the holder lines up and coacts with the notch. Thus, the holder attaches directly to the rim of the pan and is interposed between the handle means and said pan. More specifically, the holder, as a unitary device, is denoted by the numeral 7 and comprises an appropriately proportioned and shaped plate or body portion 8, said plate being of the longitudinal curvature shown in Figure 3 and the aforementioned tang D being welded or otherwise attached to said plate. The central upper edge portion of the plate is fashioned into an extension 10 which may be said to be of general rectangular form and this not only connects with the tang D but fits beneath and is held partly in place by a suitable stabilizing cleat 11 carried by the ferrule, a customary part, on the handle proper. The lower left hand end portion of the plate as brought out in Figure 3, lines up with the notch H in the pan rim and is suitably affixed to the exterior surface of the pan rim by an appropriately curved portion which may be conveniently designated as an apron 9.

The stated plate is provided at transverse end portions (see Figure 4) with spaced parallel end flanges 12 and coacting marginal edge portions of the plate are fashioned and provided with complemental converging so-called rear flanges 13 which join with the flanges 12 and define a shallow receptacle. The converging ends of the flanges 13 merge and coact in close spaced relation with the cleat 11 and extension 10 in substantially closing the coacting area of the receptacle. The flanges 13 serve as supporting elements for a coacting intermediate portion of the blade of the pancake turner, as shown in Figures 1, 2 and 3.

It will be noted that the ends of the flanges 12 adjacent the aforementioned rim notch H actually project through said notch and slightly into the area of the pan and that the curvature of the main plate portion 8 is such that grease which drips from the blade of the pancake turner is trapped and shunted by said plate — which then acts as a chute — back into the pan by way of the stated notch. It will further be noted that it is necessary to provide retaining elements to properly support the blade of the pancake turner in the position shown in Figure 3. Therefore, the end portions of the flanges 12 which line up with the stated notch are provided with lateral horizontal bends 14 having down bent or depending terminals 15 which are shaped as shown and constitute lugs or detents which contact the blade of the pancake turner. These lugs are toed inwardly and downwardly and are properly arranged in relation to the rim of the pan, flanges and plate but they permit the blade of the pancake turner to be rested partly on the flanges 13 as shown in Figure 3 and then hooked beneath the lugs 15. Under this arrangement the blade is wedged frictionally in place and is satisfactorily held against displacement. What is more, the blade may be readily inserted and removed in relation to the holder as is obvious. Any surplus grease which is clinging on the blade after it has been used and is racked in the holder is then trapped, retrieved and permitted to drain back into the pan.

It is evident that an accessory of this type is a handy contrivance in the kitchen. It will serve a long-felt need, will keep the pancake turner ever ready for use, and poised in such a way as to be equally ready for expeditious insertion and removal. In fact, these and other features and advantages will be evident to persons skilled in the art to which the invention relates.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A frying pan accessory serving as a holder for a pancake turner, said accessory comprising a plate including a body portion having an apron for attachment to the rim of a pan, and an extension, said extension being adapted for connection with the handle of a pan, said body portion being provided with flanges, said flanges including converging portions constituting rests for the blade of a pancake turner, said flanges being further provided with down-bent lugs, and said lugs being fashioned into detents, said detents being adapted to frictionally grip the blade of the pancake turner.

2. In a utensil construction of the class described, a pan including an upstanding marginally surrounding rim, a handle, and a handle attaching connection between the handle and said rim, said connection embodying a body portion lying outside of the rim of the pan and the latter being provided with marginal surrounding upstanding flanges coacting with the body in forming a receptacle for a pancake turner, said flanges being provided with detents, and said detents overlying said body portion and being arranged and shaped and spaced from the body portion to permit the blade portion of the pancake turner to be held between the rim and detents and confined by the flanges.

3. A holder for a pancake turner, in the form of a handle for a frying pan or the like, said holder comprising a plate shaped and proportioned to accommodate the blade portion of a conventional type pancake turner, the lower end portion of said plate being fashioned and adapted for connection with the outside of the rim of a pan and having upstanding flanges, the plate and flanges coacting and combining to define a grease receptacle, the latter serving to collect grease and to drain same back into the pan, said flanges at points adjacent the rim of said pan being provided with down bent lugs, said lugs constituting detents and said detents being spaced from the plate in a manner to permit the blade of the pancake turner to be slipped removably between the rim and detents to be held removably in place, said flanges confining and holding the blade in draining position on the rim.

4. A frying pan having a holder for a pancake turner comprising a receptacle constituting a receiver and grease collector including a body portion having an apron for attachment to the outside of a rim of a pan, said body portion being provided with marginally arranged upstanding flanges, said flanges including converging portions constituting rests for the blade of a pancake turner, said flanges being further provided with down bent lugs, said lugs being fashioned into detents, said detents being adapted to frictionally grip the blade of a pancake turner on the inside of said rim.

GEORGE PISTEY.

REFERENCES CITED

The following references are of record in the file of this patent:

UNITED STATES PATENTS

| Number | Name | Date |
|---|---|---|
| Re. 3,821 | Bigelow | Feb. 8, 1870 |
| 217,938 | Graves | July 29, 1879 |
| 289,312 | Sheldon | Nov. 27, 1883 |
| 344,567 | Coleman | June 29, 1886 |
| 1,182,732 | Avery | May 9, 1916 |
| 1,196,543 | Hauf, Jr. | Aug. 29, 1916 |
| 1,211,171 | Kershner | Jan. 2, 1917 |
| 1,304,628 | Thornton | May 27, 1919 |
| 1,554,887 | Smith | Sept. 22, 1925 |
| 1,627,575 | Rovelli | May 10, 1927 |
| 2,034,940 | Butler | March 24, 1936 |
| 2,070,495 | Strutz et al. | Feb. 9, 1937 |
| 2,362,720 | Reichart | Nov. 14, 1944 |